United States Patent
Kilicarslan et al.

(10) Patent No.: US 12,130,606 B2
(45) Date of Patent: Oct. 29, 2024

(54) DISTURBANCE COMPENSATION FOR SUBSTRATE PROCESSING RECIPES

(71) Applicant: APPLIED MATERIALS, INC., Santa Clara, CA (US)

(72) Inventors: Atilla Kilicarslan, Mountain View, CA (US); Raechel Chu-Hui Tan, Oakland, CA (US); Brooke Elise Montgomery, Morgan Hill, CA (US); Paul Z. Wirth, Kalispell, MT (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/559,061

(22) Filed: Dec. 22, 2021

(65) Prior Publication Data
US 2023/0195072 A1    Jun. 22, 2023

(51) Int. Cl.
G05B 19/18    (2006.01)
(52) U.S. Cl.
CPC .. G05B 19/188 (2013.01); G05B 2219/45031 (2013.01)
(58) Field of Classification Search
CPC ........ G05B 19/188; G05B 2219/45031; H01L 21/02002; G06N 20/00
See application file for complete search history.

(56) References Cited

U.S. PATENT DOCUMENTS

| | | | |
|---|---|---|---|
| 8,282,983 B1 | 10/2012 | Kapoor et al. | |
| 8,880,210 B2 | 11/2014 | Porthouse et al. | |
| 2013/0018500 A1* | 1/2013 | Porthouse | G05D 16/2046 700/104 |
| 2017/0323813 A1* | 11/2017 | Silveira | C23C 16/50 |
| 2018/0138061 A1* | 5/2018 | Kraus | H01L 21/67155 |
| 2019/0139796 A1* | 5/2019 | Lee | H01L 21/67017 |
| 2019/0393059 A1* | 12/2019 | Zhang | G05B 13/048 |
| 2020/0090968 A1* | 3/2020 | Van Selow | H01L 21/67109 |
| 2021/0373523 A1 | 12/2021 | Shankaramurthy et al. | |

FOREIGN PATENT DOCUMENTS

| | | |
|---|---|---|
| JP | 2021-162471 A | 10/2021 |
| KR | 10-2019-0074353 A | 6/2019 |

OTHER PUBLICATIONS

International Search Report and Written Opinion for the International Application No. PCT/US2022/053240, mailed on Apr. 5, 2023, 9 pages.

* cited by examiner

Primary Examiner — Kenneth M Lo
Assistant Examiner — Mohammed Shafayet
(74) Attorney, Agent, or Firm — Lowenstein Sandler LLP

(57) ABSTRACT

A method includes receiving first sensor data associated with a first iteration of a first recipe operation of a substrate processing recipe. The method further includes determining disturbance data, the disturbance data being a difference between the first sensor data and first setpoint data of the first recipe operation. The method further includes determining, based at least in part on the disturbance data, a first actuation value associated with one or more components of a processing chamber. Actuation of the one or more components according to the first actuation value compensates for the disturbance data. The method further includes causing the actuation of the one or more components based on the first actuation value during a subsequent iteration of the first recipe operation of the substrate processing recipe to compensate for the disturbance data.

20 Claims, 5 Drawing Sheets

DISTURBANCE COMPENSATION FOR SUBSTRATE PROCESSING RECIPES

TECHNICAL FIELD

The present disclosure relates to disturbance compensation, and more particularly, disturbance compensation for substrate processing recipes.

BACKGROUND

Manufacturing equipment produce products by performing operations of product recipes. For example, substrate processing equipment produce substrates by performing recipe operations of substrate processing recipes. Substrate processing recipes have multiple recipe operations. Some of the recipe operations are repeated in a substrate processing recipe.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving first sensor data associated with a first iteration of a first recipe operation of a substrate processing recipe. The method further includes determining disturbance data, the disturbance data being a difference between the first sensor data and first setpoint data of the first recipe operation. The method further includes determining, based at least in part on the disturbance data, a first actuation value associated with one or more components of a processing chamber. Actuation of the one or more components according to the first actuation value compensates for the disturbance data. The method further includes causing actuation of the one or more components based on the first actuation value during a subsequent iteration of the first recipe operation of the substrate processing recipe to compensate for the disturbance data.

In another aspect of the disclosure, a non-transitory machine-readable storage medium storing instructions which, when executed, cause a processing device to receive first sensor data associated with a first iteration of a first recipe operation of a substrate processing recipe. The processing device is further to determine disturbance data, the disturbance data being a difference between the first sensor data and first setpoint data of the first recipe operation. The processing device is further to determine, based at least in part on the disturbance data, a first actuation value associated with one or more components of a processing chamber. Actuation of the one or more components according to the first actuation value compensates for the disturbance data. The processing device is further to cause actuation of the one or more components based on the first actuation value during a subsequent iteration of the first recipe operation of the substrate processing recipe to compensate for the disturbance data.

In another aspect of the disclosure, a system includes memory and a processing device coupled to the memory. The processing device is to receive first sensor data associated with a first iteration of a first recipe operation of a substrate processing recipe. The processing device is further to determine disturbance data, the disturbance data being a difference between the first sensor data and first setpoint data of the first recipe operation. The processing device is further to determine, based at least in part on the disturbance data, a first actuation value associated with one or more components of a processing chamber. Actuation of the one or more components according to the first actuation value compensates for the disturbance data. The processing device is further to cause actuation of the one or more components based on the first actuation value during a subsequent iteration of the first recipe operation of the substrate processing recipe to compensate for the disturbance data.

BRIEF DESCRIPTION OF THE DRAWINGS

The present disclosure is illustrated by way of example, and not by way of limitation in the figures of the accompanying drawings.

DETAILED DESCRIPTION

Figure 1:
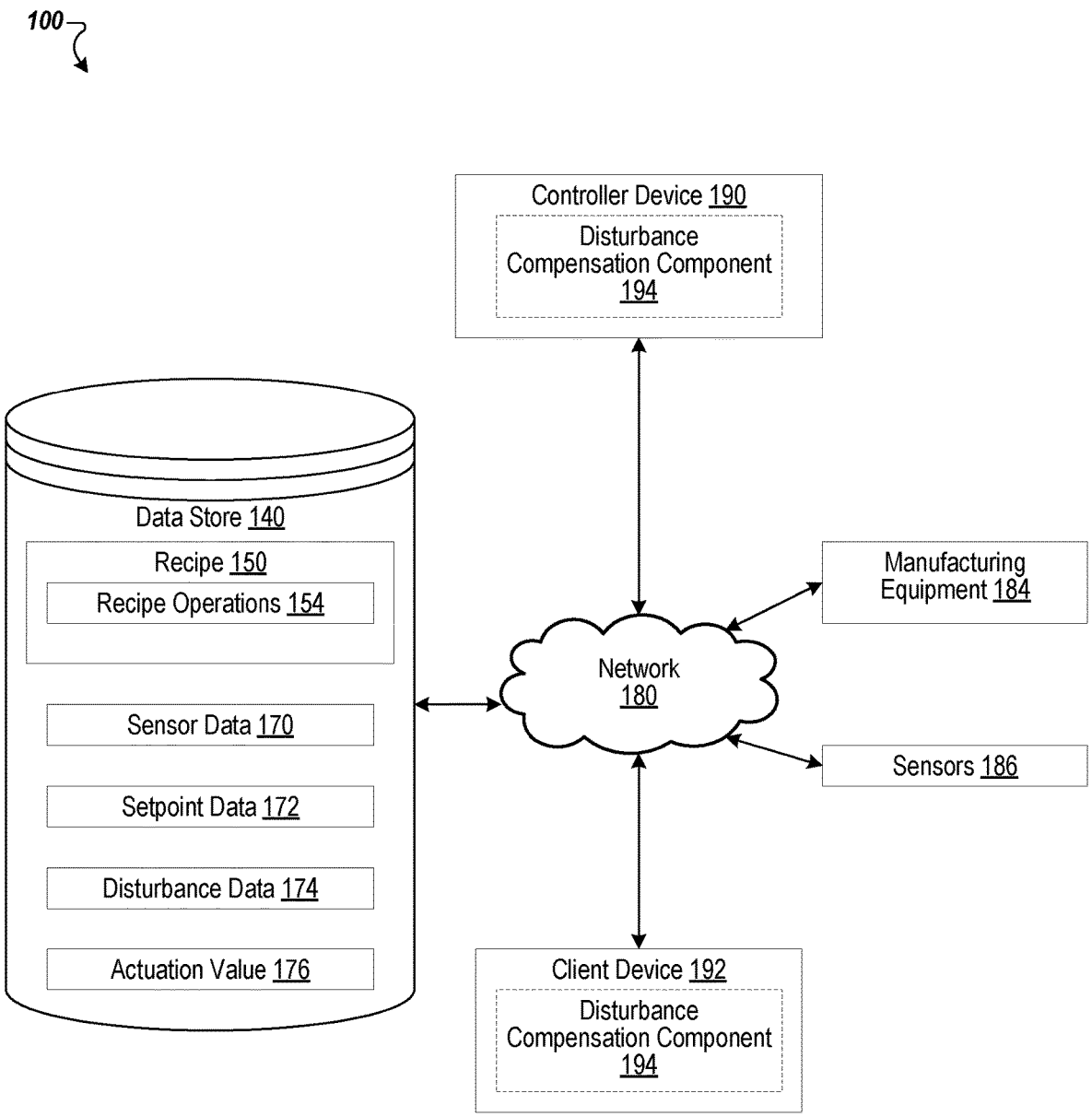
FIG. 1 is a block diagram illustrating an exemplary system architecture, according to certain embodiments.

Described herein are technologies directed to disturbance compensation for substrate processing recipes (e.g., selective disturbance compensator for improved tracking performance, rejecting unmodeled disturbances in volumes using performance-based selective active learning to improve tracking performance).

Manufacturing equipment produce products by performing operations of product recipes. For example, substrate processing equipment process substrates (e.g., wafers, semiconductors, displays, etc.) by performing recipe operations of substrate processing recipes. Substrate processing recipes include multiple recipe operations, such as one or more of transfer operations (e.g., robots transporting substrates to different locations), processing operations (e.g., processing substrates in processing chambers), cleaning operations (e.g., cleaning the processing chamber after a processing operation), and/or the like. In some examples, multi-layer features are fabricated on substrates using a substrate processing recipe that includes a specific sequence of repeating recipe operations.

Different recipe operations are to occur at specific recipe setpoints (e.g., pressure, temperature, etc.). For example, the recipe operation of deposition of material on a substrate is to occur at a specific pressure and/or temperature. Differences between the recipe setpoints and the actual conditions is referred to as disturbances (e.g., pressure disturbance is a difference between the setpoint pressure value and the actual pressure value) which cause production of defective substrates.

In some examples, a recipe operation includes providing fluid into the processing chamber in a gas state and applying radio frequency (RF) energy to the fluid to change the fluid from the gas state to a plasma state (e.g., referred to as striking plasma). As the fluid changes from a gas state to a plasma state, there is a dissociation of molecules of the fluid which increases the pressure in the processing chamber. Transition of fluid from the gas state to the plasma state is not instantaneous and takes time to stabilize (e.g., there are pockets of fluid at a partially changed state). Disturbances (e.g., actual pressure and temperature values not meeting recipe setpoint values) cause the fluid to take longer to stabilize at the plasma state and cause production of defective substrates (e.g., variations on thicknesses of layers of substrates).

Conventional systems determine a difference between recipe setpoints and actual conditions (e.g., disturbances) during each recipe operation and take reactive actions during each recipe operation to attempt to make the actual conditions match the recipe setpoint. Some disturbances are fast changing and unmodeled. Reactive actions of conventional systems do not take effect until after the disturbance starts to negatively affect the forming of features on the substrate. The uncompensated disturbances reduce the quality of the substrates being processed and can reduce the substrate-to-substrate consistency. For example, the process of changing fluid from gas state to plasma state by applying RF energy causes a change in pressure of the processing chamber. Conventional systems attempt to react to the changes in pressure after part of the substrate processing has been performed which causes the substrates to be processed in a non-uniform way and to have inconsistent features (e.g., variations in thicknesses).

The methods and systems disclosed herein provide disturbance compensation for substrate processing recipes (e.g., a selective disturbance compensator for improved tracking performance during a recipe operation of a substrate processing recipe).

A processing device receives first sensor data associated with a first iteration of a first recipe operation of a substrate processing recipe. The first iteration is a first execution of the first recipe operation. The substrate processing recipe includes multiple recipe operations and some of the recipe operations are repeated. For example, a substrate processing recipe can have multiple nitride deposition operations, multiple oxide deposition operations, multiple transition operations, etc. In some embodiments, each recipe operation includes actuation of one or more components associated with the processing chamber. In some embodiments, a first recipe operation results in a change in an internal condition of the processing chamber. For example, a first recipe operation includes actuation of a component to adjust RF energy provided to the processing chamber, causing the plasma or gas within the chamber to react in different ways. In some embodiments, the first recipe operation includes actuation of a valve to adjust flow rate of a gas into the processing chamber. In some embodiments, the first recipe operation includes actuation of a heater to heat one or more components associated with the processing chamber. In some embodiments, a first recipe operation results in a change in internal pressure and/or temperature of the processing chamber. For example, an increase in RF energy provided to the processing chamber may increase the pressure within the processing chamber as the fluid in the chamber changes from a gas state to plasma state.

In some embodiments, the first sensor data includes one or more of pressure data, temperature data, or other data associated with the processing chamber. The first sensor data tracks or indicates one or more conditions internal to the processing chamber during the first recipe operation. In some embodiments, the processing device receives the sensor data from one or more sensors are disposed in the processing chamber and sense one or more conditions inside the processing chamber.

Subsequent to receiving the first sensor data, the processing device determines disturbance data. The disturbance data is a difference between the first sensor data and first setpoint data of the first recipe operation. In some embodiments, first setpoint data is ideal conditions that are to be present in the processing chamber during the first recipe operation, and first sensor data is actual conditions present in the processing chamber during the first recipe operation. For example, the first setpoint data may indicate the internal pressure of the processing chamber is to be at a predetermined pressure value for the duration of the first recipe operation, or, in another example, the first setpoint data may indicate that the internal pressure of the processing chamber is to change from a first predetermined pressure value to a second predetermined pressure value during the first recipe operation. In some embodiments, the first setpoint data is first pressure setpoint data. In some embodiments, the first setpoint data is first temperature setpoint data. In another example, the first setpoint data may indicate the internal temperature of the processing chamber is to be at a predetermined temperature value, or that the internal temperature is to change from a first predetermined temperature value to a second predetermined temperature value during the first recipe operation.

The processing device determines a first actuation value associated with one or more components of the processing chamber. In some embodiments, the components of the processing chamber include one or more of a heater (e.g., heats the substrate, heats the susceptor on which the substrate is disposed, etc.), a cooling component (e.g., heat transfer fluid that flows through the susceptor on which the substrate is disposed), a throttle valve (e.g., allows fluid to exit the processing chamber), mass flow control valve (e.g., allows fluid to enter the processing chamber), or an RF generator (e.g., applies RF energy to the processing chamber to change the fluid from a gas state to a plasma state). In some embodiments, a first recipe operation includes actuation values, such as actuating the throttle valve, actuating the heater, or actuating the RF generator. The first actuation value may be an adjustment to an actuation value of the first recipe operation. The first actuation value is one or more inputs for one or more of the components that, when the component is actuated, will at least partially reduce the disturbance within the processing chamber, the disturbance being indicated by the disturbance data. In some embodiments, the first actuation value is associated with an input of a heater of the process chamber. In some embodiments, the first actuation value is associated with a position of a throttle valve of the process chamber. In some embodiments, the first actuation value is associated with an input of a mass flow controller of the process chamber. In some embodiments, the first actuation value is associated with an input of an RF generator of the process chamber. For example, the processing device determines an actuation value (e.g., input) for a heater of the processing chamber to compensate for a temperature disturbance. In another example, the processing device determines an actuation value (e.g., input) for a throttle valve of the processing chamber to compensate for a pressure disturbance. In some embodiments, the processing device determines a position of the throttle valve to adjust flow rate of gas out of the processing chamber. In some embodiments, the processing device determines one or more positions (e.g., values) of the throttle valve to compensate for a pressure disturbance within the processing chamber indicated by the disturbance data. For example, after an increase in RF input to plasma within the processing chamber, the pressure within the chamber may be disturbed and the processing device determines one or more positions (e.g., actuation values) of the throttle valve to settle the disturbance. The settling of the disturbance causes the first sensor data to track the first setpoint data.

Based on the first actuation value, the processing device causes actuation of one or more components of the processing chamber during a subsequent iteration of the first recipe operation of the substrate processing recipe. In some embodiments, the processing device sends a signal to one or more of the components based on the first actuation value. In some embodiments, the processing device causes the recipe to be updated based on the first actuation value. In some embodiments, the first actuation value is associated with the first recipe operation by an identifier, the identifier being specific to the first recipe operation. In some embodiments, the first actuation value is retrieved for use with subsequent iterations of the first recipe operation by the identifier. In some embodiments, the processing device causes the throttle valve of the processing chamber to be adjusted (e.g., opened or closed) by an amount based on the first actuation value. In some embodiments, the processing device causes a heater of the processing chamber to be adjusted by a specified amount based on the first actuation value. In some embodiments, the processing device causes actuating power provided to the heater based on the first actuation value. By causing actuation of the one or more components during subsequent iterations of the first recipe operation, the disturbance data (e.g., difference between sensor data and setpoint data) is reduced.

Aspects of the present disclosure result in technological advantages. The present disclosure preemptively compensates for disturbances in a processing chamber for subsequent recipe operations compared to conventional solutions that reactively attempt to compensate for disturbances. By preemptively compensating for the disturbances, the present disclosure has less negative effects on the recipe operation compared to conventional solutions. The present disclosure produces substrates of a higher quality and that are more consistent compared to substrates produced by conventional systems. Further, the present disclosure provides for more accurate and precise substrate processing recipe operations by compensating for disturbances associated with the processing chamber, leading to more consistent layer depositions upon the substrates, again allowing for more consistent and higher quality finished substrates when compared to conventional systems. With improved accuracy and precision, stack defects, and stack roughness of the substrates are reduced by the present disclosure.

Although some embodiments of the present disclosure describe compensating for processing chamber disturbances in a substrate processing system, the present disclosure, in some embodiments, is applied to other systems, such as manufacturing systems, etc. that perform operations over time.

FIG. 1 is a block diagram illustrating a system 100 (e.g., an exemplary system architecture, computing environment), according to certain embodiments. The system 100 includes a client device 192, manufacturing equipment 184 (e.g., substrate processing equipment), sensors 186, a controller device 190 (e.g., controller, server), and a data store 140.

The client device 192, manufacturing equipment 184, sensors 186, controller device 190, and data store 140 are coupled to each other via a network 180. In some embodiments, network 180 is a public network that provides client device 192 with access to the controller device 190, data store 140, and other publically available computing devices. In some embodiments, network 180 is a private network that provides client device 192 access to manufacturing equipment 184, sensors 186, data store 140, and other privately available computing devices. Network 180 include one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The controller device 190 (e.g., controller, server) includes one or more computing devices such as a rack-mount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc. In some embodiments, the controller device 190 includes a disturbance compensation component 194 for causing substrates to be processed based on actuation values 176. In some embodiments, the disturbance compensation component 194 is used to perform one or more operations of methods 200A-B of FIGS. 2A-B or the methods of sequences 300A-B of FIGS. 3A-B. In some embodiments, the disturbance compensation component 194 includes a model-based controller. In some embodiments, the model of the model-based controller is a physics-based model. In some embodiments, controller device 190 is a controller of a semiconductor processing system and is used to control the manufacturing equipment 184. In some embodiments, controller device 190 includes a software bridge.

The client device 192 includes a computing device such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. In some embodiments, the client device 192 displays a Graphical User Interface (GUI) to receive input and to display output. In some embodiments, the client device 192 includes a disturbance compensation component 194 for causing substrates to be processed based on actuation values 176. In some embodiments, the disturbance compensation component 194 is used to perform one or more operations of methods 200A-B of FIGS. 2A-B or the methods of sequences 300A-B of FIGS. 3A-B. In some embodiments, client device 192 includes a software bridge.

In some embodiments, the disturbance compensation component 194 is a disturbance control component. Disturbance compensation component 194 receives sensor data 170 (e.g., from sensors 186, from data store 140) associated with a recipe operation 154 of a recipe 150 (e.g., substrate processing recipe), determines disturbance data 174 (e.g., difference between the sensor data 170 and setpoint data 172 of the recipe operation 154), determines an actuation value 176 (e.g., associated with one or more components of the manufacturing equipment 184 to compensate for the disturbance data), and causes actuation of one or more components of the manufacturing equipment 184 during a subsequent iteration of the first recipe operation. In some embodiments, the disturbance compensation component 194 causes actuation of the one or more components by transmitting the actuation value 176 (e.g., to the data store 140, to the controller device 190, to the client device 192). In some embodiments, the controller device 190 causes the substrates to be processed by manufacturing equipment 184 based on the actuation value 176.

In some embodiments, the manufacturing equipment 184 (e.g., cluster tool) is part of a substrate processing system (e.g., integrated processing system). The manufacturing equipment 184 includes one or more of an enclosure system (e.g., substrate carrier, front opening unified pod (FOUP), autoteach FOUP, process kit enclosure system, substrate enclosure system, cassette, etc.), a side storage pod (SSP), an aligner device (e.g., aligner chamber), a factory interface (e.g., equipment front end module (EFEM)), a load lock, a transfer chamber, one or more processing chambers, a robot arm (e.g., disposed in the transfer chamber, disposed in the front interface, etc.), and/or the like. The enclosure system, SSP, and load lock mount to the factory interface and a robot arm disposed in the factory interface is to transfer content (e.g., substrates, process kit rings, carriers, validation wafer, etc.) between the enclosure system, SSP, load lock, and factory interface. The aligner device is disposed in the factory interface to align the content. The load lock and the processing chambers mount to the transfer chamber and a robot arm disposed in the transfer chamber is to transfer content (e.g., substrates, process kit rings, carriers, validation wafer, etc.) between the load lock, the processing chambers, and the transfer chamber.

The manufacturing equipment 184 includes one or more processing chambers to produce substrates based on a recipe 150 and actuation values. The recipe 150 includes a set of recipe operations 154 to produce features (e.g., deposit layers, fabricate multi-layer features) on a substrate.

The sensors 186 provide sensor data 170 (e.g., sensor values, trace data) associated with manufacturing equipment 184 (e.g., associated with producing, by manufacturing equipment 184, substrates). The manufacturing equipment 184 produces substrates following a recipe 150. Sensor data 170 is received from different sensors 186 over a period of time (e.g., corresponding to at least part of a recipe 150 or recipe operation 154).

Data store 140 is a memory (e.g., random access memory), a drive (e.g., a hard drive, a flash drive), a database system, or another type of component or device capable of storing data. Data store 140 includes multiple storage components (e.g., multiple drives or multiple databases) that span multiple computing devices (e.g., multiple server computers). The data store 140 stores recipe 150, sensor data 170, setpoint data 172, disturbance data 174, and actuation value 176.

Recipe 150 includes recipe operations 154. Recipe operations 154 include processing operations (e.g., chamber operation), and cleaning operations. Recipe 150 includes a set of instructions to be carried out by components of manufacturing equipment 184 to process or manufacture products. Recipe operations 154 is a subset of instructions for recipe 150. In some embodiments, Recipe 150 includes multiple of the same recipe operations 154. In some embodiments, recipe operations 154 is one of a nitride deposition operation, an oxide deposition operation, a transitory operation (e.g., setpoints within the chamber change), or another manufacturing or processing operation, including a cleaning operation. In some embodiments, a recipe 150 is provided to the client device 192 (e.g., via user input). The recipe 150 describes what recipe operations a substrate will undergo at different stages and the process to be run in each chamber.

Sensor data 170 (e.g., sensor values, trace data) is received from sensors 186 associated with manufacturing equipment 184 (e.g., associated with producing, by manufacturing equipment 184, substrates). The sensor data 170 may be received from sensors 186 during execution of the recipe operations 154.

Setpoint data 172 includes processing chamber setpoints for recipe operations 154 associated with the substrate processing system. Setpoint data 172 are predetermined desired conditions for a process within the processing chamber, such as ideal pressure values, or ideal temperature values during a recipe operation. For example, a recipe operation 154 may specify that the recipe operation is to be performed at a predetermined pressure or temperature. Setpoint data 172 indicates the predetermined desired conditions at which the recipe operation 154 is to take place. In some embodiments, setpoint data 172 includes pressure setpoint data. In some embodiments, setpoint data 172 includes temperature setpoint data. Analogously, sensor data 170 indicates actual conditions within the processing chamber during a recipe operation 154, such as actual pressure values, or actual temperature values.

Disturbance data 174 includes a difference between setpoint data 172 associated with a recipe operation 154 and sensor data 170 received during the execution of recipe operation 154. In some embodiments, disturbance data 174 includes multiple values reflecting differences between setpoint data 172 and sensor data 170 over time. In some embodiments, disturbance data 174 is a curve which reflects a comparison of a curve fit to the setpoint data 172 and a curve fit to the sensor data 170.

Actuation value 176 is a value determined by the disturbance compensation component 194 to compensate for a disturbance indicated by disturbance data 174 during a recipe operation 154. The client device 192 generates an actuation value 176 (e.g., based on setpoint data 172 and disturbance data 174) for the disturbance compensation so that substrates can be processed by manufacturing equipment 184 in a consistent manner with improved throughput. Actuation value 176 may be associated with certain components of manufacturing equipment 184 and can be used during subsequent iterations of the same recipe operation 154 by the manufacturing equipment 184. Use of the actuation value 176 during subsequent iterations of the same recipe operation 154 reduces the difference between setpoint data 172 and sensor data 170.

In some embodiments, data store 140 stores sensor data 170 from sensors 186. Sensor data 170 include values of one or more of temperature (e.g., heater temperature), spacing (SP), pressure, High Frequency Radio Frequency (HFRF), Low Frequency Radio Frequency (LFRF), Radio Frequency (RF) power, voltage of Electrostatic Chuck (ESC), electrical current, flow, power, voltage, etc. In some embodiments, sensor data 170 is associated with or indicative of manufacturing parameters such as hardware parameters (e.g., settings or components (e.g., size, type, etc.) of the manufacturing equipment 184) or process parameters of the manufacturing equipment. The sensor data is provided while the manufacturing equipment 184 is performing manufacturing processes (e.g., recipe operations 154, equipment readings when processing products). In some embodiments, the sensor data 170 is different for each substrate and/or layer.

In some embodiments, the sensor data 170 and/or disturbance data 174 is used to determine whether the recipe 150, is to be updated (e.g., to improve quality of substrates, health of the manufacturing equipment 184, energy usage, etc.).

In some embodiments, the functions of client device 192 and controller device 190 are provided by a fewer number of machines. In some embodiments, client device 192 and controller device 190 are integrated into a single machine.

In some embodiments, one or more functions described as being performed by client device 192 can also be performed on controller device 190, if appropriate. In some embodiments, one or more functions described as being performed by controller device 190 can also be performed on client device 192, if appropriate. In addition, the functionality attributed to a particular component can be performed by different or multiple components operating together. For example, in some embodiments, the controller device 190 determines the actuation value 176 and in some embodiments, the client device 192 determines the actuation value 176.

In addition, the functions of a particular component can be performed by different or multiple components operating together. In some embodiments, the controller device 190 is accessed as a service provided to other systems or devices through appropriate application programming interfaces (API).

In some embodiments, a "user" is represented as a single individual. However, other embodiments of the disclosure encompass a "user" being an entity controlled by a plurality of users and/or an automated source. For example, a set of individual users federated as a group of administrators is considered a "user."

Although portions of the present disclosure refer to causing substrates to be processed based on setpoint data 172 and disturbance data 174 (e.g., based on an actuation value 176) via substrate processing in a substrate chamber of a substrate processing system, in some embodiments, the present disclosure is generally applied to performing other processes (e.g., via a manufacturing system) based on setpoint data and/or disturbance data.

Figure 2A:
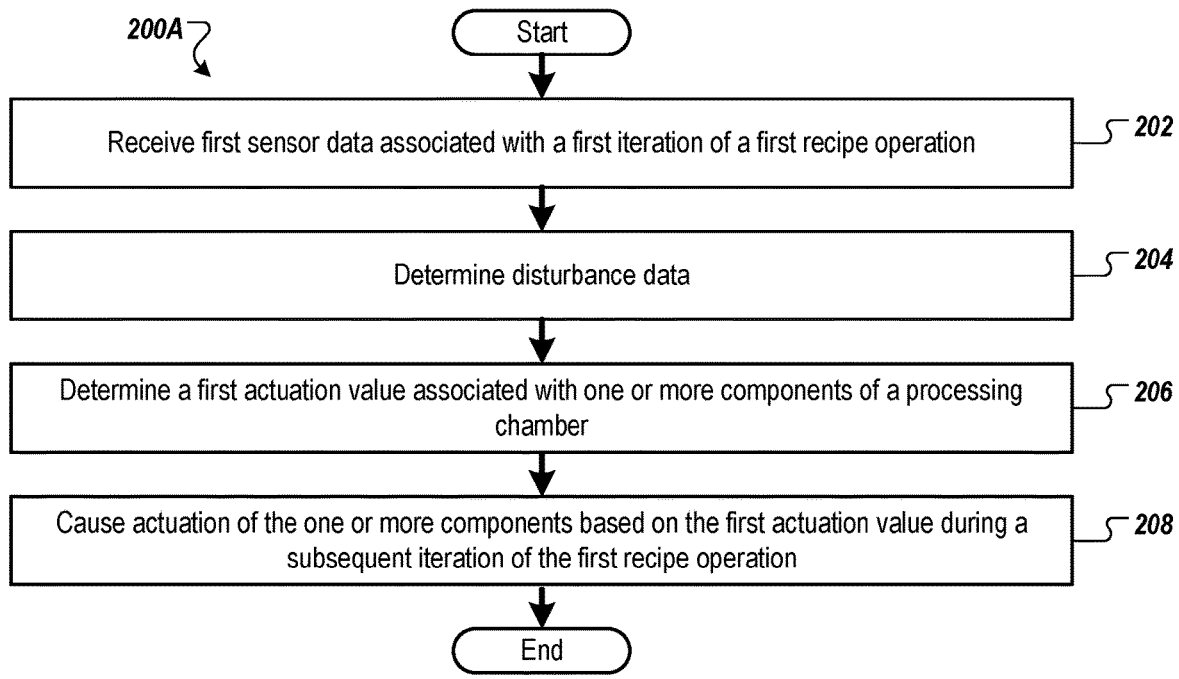
FIGS. 2A-B are flow diagrams of methods associated with disturbance compensation for substrate processing recipes, according to certain embodiments.
Figure 2B:
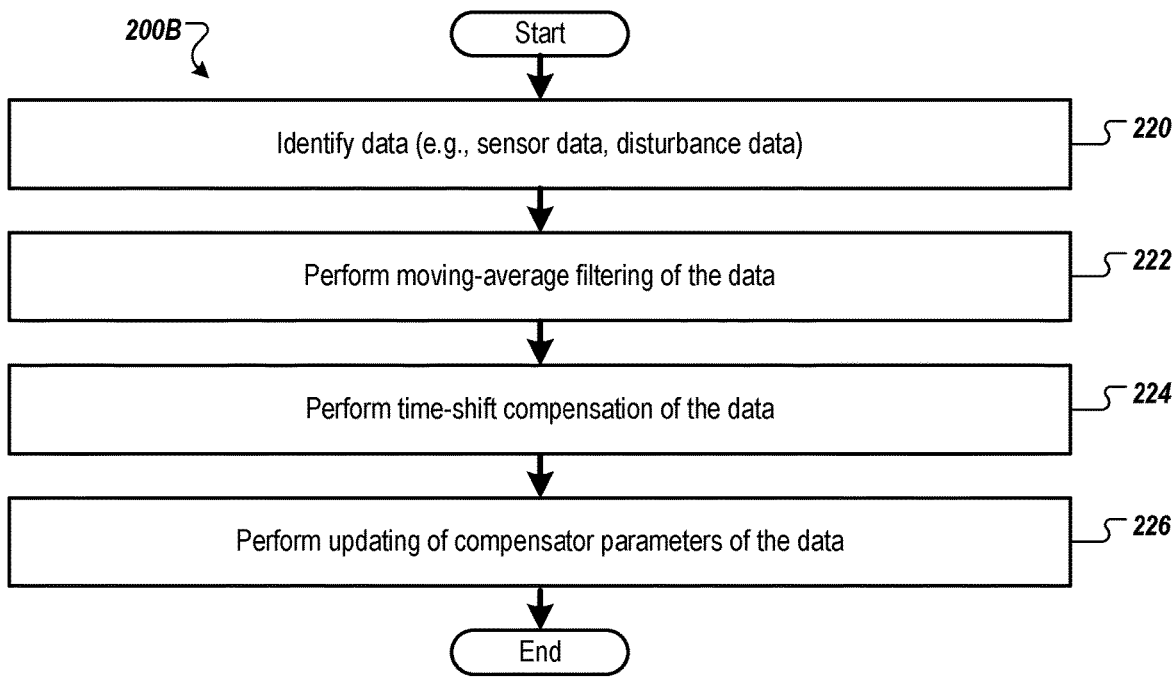

FIGS. 2A-B are flow diagrams of methods 200A-B associated with disturbance compensation for substrate processing recipes, according to certain embodiments. Methods 200A-B are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, methods 200A-B are performed, in part, by controller device 190 (e.g., disturbance compensation component 194). In some embodiments, methods 200A-B are performed, in part, by client device 192 (e.g., disturbance compensation component 194). In some embodiments, a non-transitory computer-readable storage medium stores instructions that when executed by a processing device (e.g., of controller device 190, client device 192, etc.) cause the processing device to perform one or more of methods 200A-B.

For simplicity of explanation, methods 200A-B are depicted and described as a series of operations. However, operations in accordance with this disclosure can occur in various orders and/or concurrently and with other operations not presented and described herein. Furthermore, in some embodiments, not all illustrated operations are be performed to implement methods 200A-B in accordance with the disclosed subject matter. In addition, those skilled in the art will understand and appreciate that methods 200A-B could alternatively be represented as a series of interrelated states via a state diagram or events.

FIG. 2A is a flow diagram of a method 200A (e.g., process sequence for determining and compensating for a disturbance in a substrate processing recipe) for substrate processing equipment (e.g., a processing chamber, manufacturing equipment 184 of FIG. 1), according to certain embodiments.

At block 202 of method 200A, processing logic receives first sensor data (e.g., sensor data 170 of FIG. 1) associated with a first iteration of a first recipe operation (e.g., recipe operation 154 of FIG. 1). The first recipe operation is one of multiple recipe operations of a substrate processing recipe. The first recipe operation is to be repeated multiple times during the substrate processing recipe. In some embodiments, at block 202, the first iteration of the first recipe operation is a first running (e.g., iteration) of the first recipe operation, to be followed at a later time by subsequent iterations of the first recipe operation. In some embodiments, the processing logic is to receive second sensor data associated with the subsequent iteration during the subsequent iteration. In some embodiments, at block 202, first sensor data includes one or more of pressure data, temperature data, or flow data.

In some embodiments, the first recipe operation is an oxide layer deposition operation, a nitride layer deposition operation, transitionary operation (e.g., between deposition operations), purging operation, etc.

In some embodiments, the first sensor data includes one or more of pressure data, RF data, flow rate data, temperature data, fluid conductance data, etc.

At block 204, processing logic determines disturbance data (e.g., disturbance data 174 of FIG. 1). Disturbance data is a difference between the first sensor data of block 202 and setpoint data (e.g., setpoint data 172 of FIG. 1) associated with the recipe operation 154 of block 202. In some embodiments, the setpoint data is the same type of data as the sensor data (e.g., temperature data or pressure data). The first sensor data is associated with one or more actual conditions within the processing chamber. The setpoint data includes one or more ideal conditions of the processing chamber associated with the first recipe operation. In some embodiments, the setpoint data adjusts (e.g., is transient) from the beginning of the recipe operation to the end of the recipe operation. Disturbance data can result from sensor data within a processing chamber indicating an unbalanced change of state within the chamber (e.g., a disturbance).

At block 206, processing logic determines a first actuation value associated with one or more components of the processing chamber based on the disturbance data (e.g., disturbance data 174 of FIG. 1). Actuation of the one or more components according to the first actuation value compensates for the disturbance data. In some embodiments, the processing logic determines the first actuation value by using a model of the processing chamber, iterative learning control, or a lookup table. In some embodiments, the model of the processing chamber is a physics-based model. In some embodiments, the first actuation value is associated with the first recipe operation by an identifier. The first actuation value is based on the disturbance data. In some embodiments, the first actuation value is a value, that, when the one or more components of the processing chamber are actuated based on the first actuation value, the sensor data is closer to the setpoint data. In some embodiments, the first actuation value is associated with a throttle valve of the processing chamber, a heater of the processing chamber, or a mass flow controller of the processing chamber. In some embodiments, the actuation value is a series of values (e.g., transient data) corresponding to a series of component actuations. In some embodiments, the actuation value indicates that a throttle valve of the processing chamber is to open and/or close in a specific manner so as to compensate for a pressure disturbance within the processing chamber. For example, by the model of the processing chamber, an equivalent flow is calculated which corresponds to a pressure disturbance within the processing chamber, and the throttle valve of the processing chamber is opened an amount that corresponds with the equivalent flow. In some embodiments, the throttle valve is opened to adjust flow rate of gas out of the processing chamber approximately equal to the equivalent flow rate.

At block 208, processing logic causes actuation of the one or more components of the processing chamber based on the first actuation value during a subsequent iteration of the first recipe operation to compensate for the disturbance data. In some embodiments, the first actuation value is retrieved for the subsequent iteration of the first recipe operation by the identifier. The subsequent iteration of the first recipe operation occurs during a subsequent running of the first recipe operation (e.g., during processing of the same substrate, during processing of a subsequent substrate). In some embodiments, processing logic receives second sensor data associated with the subsequent iteration. In some embodiments, the difference between the sensor data and the setpoint data is reduced, allowing for improved substrate-to-substrate consistency and quicker settling of transient conditions, leading to increased throughput. For example, after a change in setpoint data within the processing chamber, the reduction of the difference between the sensor data and the setpoint data causes the sensor data to arrive at the new setpoint data sooner.

In some embodiments, during the subsequent iteration of the first recipe operation, the processing logic receives second sensor data associated with the subsequent iteration. In some embodiments, the processing logic then determines second disturbance data based on a difference between the first setpoint value and the second sensor data. In some embodiments, the first actuation value is updated, by the processing logic, based on the second disturbance data, to use for further iterations of the first recipe operation (e.g., a second actuation value is determined based on the second disturbance data to use for further iterations of the first recipe operation). For example, if the second disturbance data meets a predetermined threshold value, the first actuation value is not updated, but if the second disturbance data does not meet the predetermined threshold value, the first actuation value is updated.

In some examples, at block 202, the first recipe operation includes applying RF energy (e.g., RF strike) to fluid in a processing chamber to cause the fluid to change from a gas state to a plasma state and the first sensor data is pressure data (e.g., provided by a pressure sensor disposed in the processing chamber) of the interior of the processing chamber in association with the RF strike. The first recipe operation may be associated with (e.g., include) first setpoint data that includes a pressure setpoint (e.g., a one or more ideal pressure values for performance of the first recipe operation). At block 204, disturbance data (e.g., difference in pressure data) may be the difference between the first sensor data and the pressure setpoint. At block 206, the first actuation value may be an actuation value for the throttle valve of the processing chamber to allow more or less fluid flow out of the processing chamber (e.g., to increase or decrease the pressure value inside the processing chamber). The first actuation value is determined based on the disturbance data.

In some embodiments, a model (e.g., physics-based model, dynamic pressure model) indicates a relationship between a manufacturing parameter and actuation of a component of the processing chamber. In some examples, a model (e.g., physics-based model) indicates a relationship between pressure value within the processing chamber and actuation of a throttle valve (e.g., during a recipe operation). The processing device may provide the disturbance data (e.g., difference in pressure data) as input to the model (e.g., physics-based model), and receive output of the first actuation value (e.g., indicative of how to actuate the throttle valve to make the pressure value match the pressure setpoint).

In some embodiments, a lookup table indicates a relationship between a manufacturing parameter (e.g., pressure values) and actuation of a component of the processing chamber (e.g., actuation of a throttle valve). The processing device may use the lookup table to determine the first actuation value corresponds to the disturbance data.

In some embodiments, iterative learning control is used to determine the first actuation value. Sensor data of a sensor associated with a processing chamber (e.g., during performance of a recipe operation) at different actuation values of a component of the processing chamber may be determined. For example, pressure values at different positions of the throttle valve (e.g., closed, 25% open, 50% open, 75% open, 100% open) may be determined. In some embodiments, change in pressure values may be determined for different changes in positions of the throttle valve (e.g., 10% decrease in pressure by opening the throttle valve an extra 25%). The relationship between the difference in sensor data and the actuation values may be determined iteratively via test runs or actual recipe operations. In some embodiments, one or more operations of FIG. 2A are performed until the disturbance data is below a threshold value.

In some embodiments, the disturbance data is difference in pressure data and the actuation value is a valve actuation value (e.g., of the throttle valve to adjust the quantity of fluid exiting the processing chamber, of the mass flow control valve to adjust the quantity of fluid entering the processing chamber).

In some embodiments, the disturbance data is a difference in temperature data and the actuation value is power provided to a heater. In some embodiments, the disturbance data is a difference in temperature data and the actuation value is cooling or heating of a heat transfer fluid flowing through a susceptor on which a substrate is disposed.

In some embodiments, the disturbance data is a difference in temperature data and the actuation value is cooling or heating of a heat transfer fluid flowing through a susceptor on which a substrate is disposed.

In some embodiments, the disturbance data is associated with the RF energy applied to the fluid in the processing chamber (e.g., pressure data, chemical composition data, energy data, temperature data) and the actuation value adjusts the amount of RF energy applied to the processing chamber (e.g., via variable capacitors to match the system impedance, RF emitter, etc.).

At block 206, the processing device may determine multiple actuation values associated with different components and at block 208 the processing device may cause actuation multiple components each based on a different actuation value.

In some embodiments, the disturbance data is a difference in chemical composition data (e.g., data about the actual plasma state in the processing chamber) from an optical emission spectroscopy (OES) sensor. The processing device may actuate one or more of a throttle valve, mass flow control valve, heater, RF emitter, etc. based on corresponding actuation values based on the chemical composition data.

In some embodiments, the sensor data, setpoint data, and disturbance data are each a set of values from a first point in time (e.g., beginning of the recipe operation) to a second point in time (e.g., ending of the recipe operation). The actuating value may be a set of actuation values (e.g., different positions for the throttle valve) to be used between the first point in time and the second point in time in subsequent iterations of the recipe operation. The causing of the actuation of the one or more components based on the set actuation values may cause the component to be actuated over time (e.g., gradually adjust the throttle valve, etc.).

In some embodiments, the processing device associates an identifier that is associated with the first recipe operation to be associated with the first actuation value. The processing device causes subsequent iterations of the first recipe operation to be performed based on the first actuation value by using the identifier to retrieve both the recipe operation and the first actuation value.

In some embodiments, the processing device updates the first recipe operation based on the first actuation value.

In some embodiments, method 200A is performed separately for every processing chamber (e.g., to account for chamber-to-chamber differences). In some embodiments, method 200A is performed separately for every recipe of recipe operations. In some embodiments, method 200A is re-run periodically for the same processing chamber (e.g., to account for changes in the processing chamber over time). In some embodiments, the actuation values determined via method 200A for a recipe performed in a processing chamber are used as a starting point for one or more of other recipes, other processing chambers, other points in time. Method 200A may be re-run to update the actuation values and/or recipe operations.

In some embodiments, method 200A is performed to determine actuation values for recipe operations of a recipe. In re-performing method 200A, the processing device may determine that one or more actuation values are to be adjusted by a value or a percentage and may adjust all of the actuation values by the same value or percentage.

FIG. 2B is a flow diagram of a method 200B associated with disturbance compensation for substrate processing recipes, according to certain embodiments. In some embodiments, method 200B is used to determine disturbance data (e.g., block 204 of FIG. 2A) to determine a first actuation value associated with one or more components of the processing chamber (e.g., block 206 of FIG. 2A).

At block 220, processing logic identifies data (e.g., sensor data, disturbance data). In some embodiments, the data is sensor data associated with an iteration of a recipe operation (e.g., block 202 of FIG. 2A). In some embodiments, the data is disturbance data associated with an iteration of a recipe operation (e.g., block 204 of FIG. 2A). The disturbance data is a difference between setpoint data (e.g., ideal data) of the recipe operation and the sensor data (e.g., actual data) associated with the iteration of the recipe operation.

In some embodiments, processing logic performs one or more post-processing operations on the identified data. At block 222, processing logic performs a moving-average filtering of the data. In some embodiments, moving-average filtering of the data includes creating a series of averages of different subsets of the full data set. Performing moving-average filtering of the data smooths or reduces noise within the data. In some embodiments, the moving-average filtering is performed by one or more of a simple moving-average filter, a cumulative moving-average filter, or a weighted moving-average filter.

At block 224, processing logic performs a time-shift compensation of the data. Due to the nature of a moving-average filter, where the output is back-shifted in time, a time-shift compensation of the data is to be performed in order for the data output from the moving-average filter to correspond with the real-time data. In some embodiments, the data output from the moving-average filter is shifted forward in time so that it corresponds with the original data.

At block 226, processing logic performs updating of compensator parameters of the data. In some embodiments, the compensator parameters include time (e.g., duration) and amplitude of the data (e.g., sensor data, disturbance data).

In some embodiments, an actuation value (e.g., actuation value 176 of FIG. 1) is determined based, at least in part, on the data (e.g., sensor data, disturbance data) that has been updated by method 200B. The actuation value may be used to cause actuation of one or more components of the processing chamber during subsequent iterations of a recipe operation (e.g., so that the disturbance is reduced by components of the processing chamber during subsequent iterations of the recipe operation).

Figure 3A:
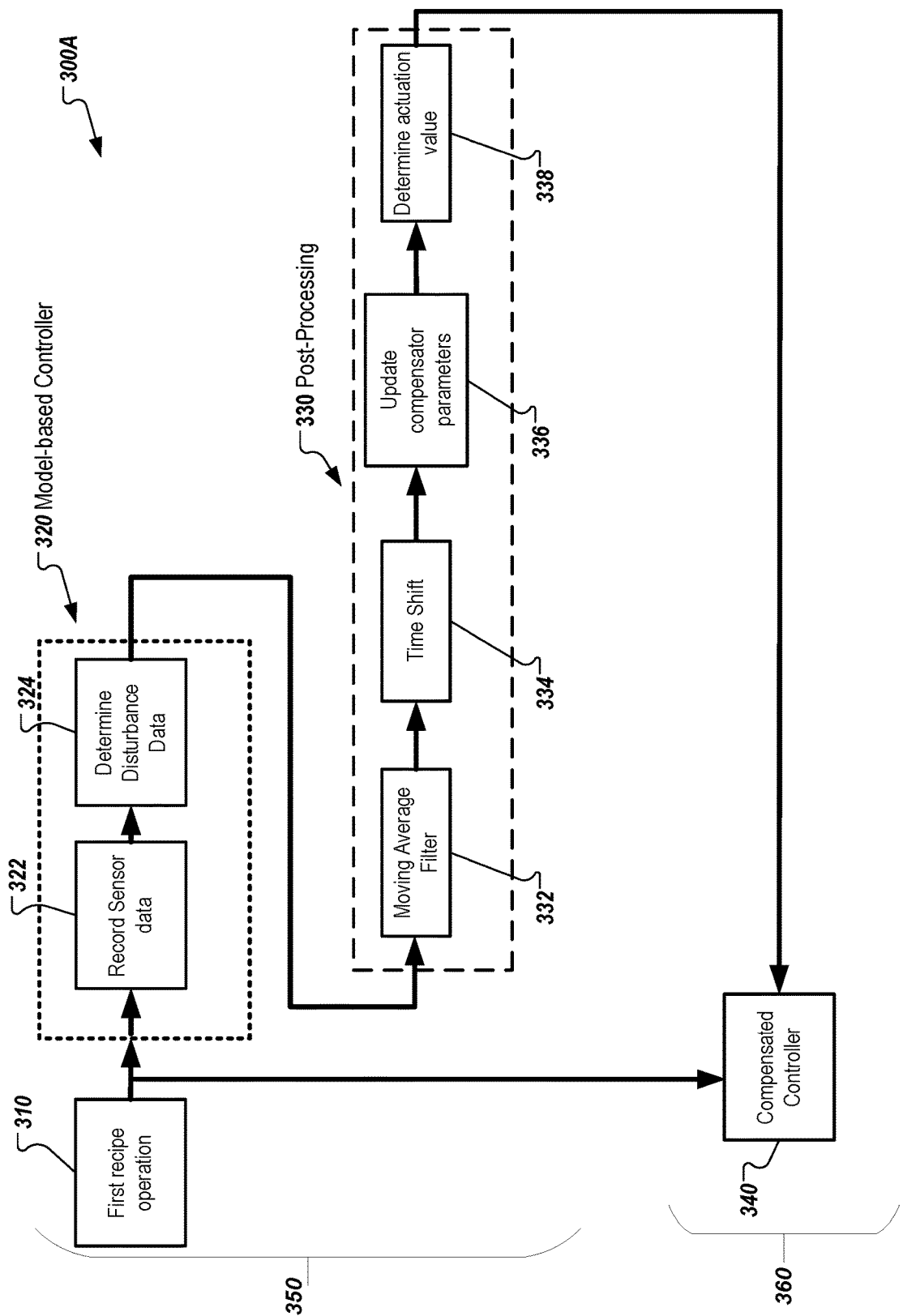
FIGS. 3A-B illustrate sequence charts associated with disturbance compensation for substrate processing recipes, according to certain embodiments.
Figure 3B:
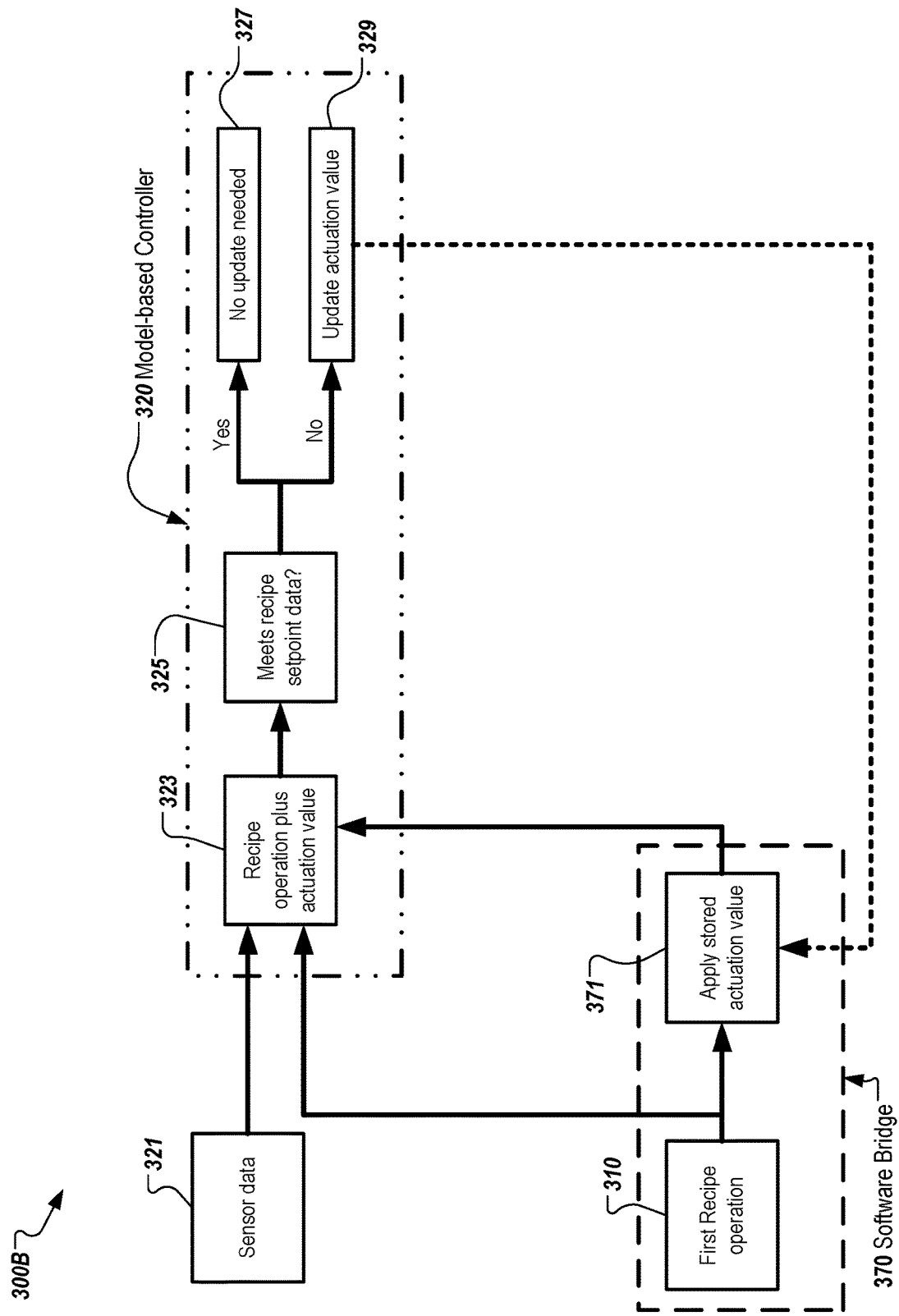

FIGS. 3A-B illustrate sequence flow charts associated with disturbance compensation for substrate processing recipes, according to certain embodiments.

FIG. 3A illustrates flow 300A for disturbance compensation associated with a substrate processing recipe, according to certain embodiments.

As part of a learning run 350, blocks 310-338 may be performed.

At block 310, a first iteration of a first recipe operation is executed in a processing chamber. In some embodiments, the first recipe operation is one of a nitride deposition operation, an oxide deposition operation, a transitory operation, etc.

At block 322, sensor data is received by a model-based controller 320 (e.g., executing on a real-time server, controller device 190 of FIG. 1, client device 192 of FIG. 1) from one or more sensors associated with a processing chamber during the first recipe operation. In some embodiments, model-based controller 320 utilizes a physics-based model of the processing chamber. In some embodiments, the sensor data includes one or more of pressure data, temperature data, or flow data, In some embodiments, the model-based controller is a part of a disturbance compensator component (e.g., disturbance compensation component 194 of FIG. 1) of a client device (e.g., client device 192 of FIG. 1) or a controller device (e.g., controller device 190 of FIG. 1). At block 322, the sensor data may be recorded to a memory (e.g., data store 140 of FIG. 1).

At block 324, processing logic determines disturbance data (e.g., block 204 of FIG. 2A). Disturbance data is the difference between the sensor data and setpoint data of the first recipe operation.

In some embodiments, the disturbance data next undergoes post-processing 330 (e.g., blocks 332-338). Post-processing takes place as part of the learning run 350. In some embodiments, post-processing includes multiple operations. At block 332 (e.g., block 222 of FIG. 2B), the disturbance data is passed through a moving average filter. The moving-average filter creates a series of averages of different subsets of the data corresponding with the full data set. The moving-average filter reduces noise in the disturbance data. As an inherent result of the moving-average filter, the data is shifted in time. At block 334 (e.g., block 224 of FIG. 2B), a time shift operation is performed on the data to shift the data in time to correlate with the sensor data from the first recipe operation (e.g., to correlate with the real-time data). At block 336, processing logic performs an update to the compensator parameters (e.g., compensator parameters of block 226 of FIG. 2B).

At block 338, processing logic determines an actuation value (e.g., actuation value 176 of FIG. 1) based on the disturbance data that has been through prost-processing 330. An actuation value is a value that, when a component of the processing chamber is actuated based on the actuation value, reduces the difference between sensor data and setpoint data for the recipe operation. The data is next fed to a controller at block 340 (e.g., a compensated controller). In some embodiments, the controller of block 340 is a model-based controller utilizing compensation values (e.g., a compensated controller). The compensated controller utilizes the actuation value in conjunction with data from the first recipe operation to perform real-time compensation 360 during a subsequent iteration of the first recipe operation. A disturbance sensed and learned during the learning run 350 is compensated for during real-time compensation 360 (e.g., a subsequent iteration of the first recipe operation). Any further run of the recipe operation is compensated using the compensated controller.

FIG. 3B illustrates flow 300B for updating a disturbance compensation associated with a recipe operation of a substrate processing recipe, according to certain embodiments. Sensor data 321 is fed into a model-based controller 320. In some embodiments, the model-based controller 320 is a disturbance compensation component (e.g., disturbance compensation component 194 of FIG. 1) of a client device (e.g., client device 192 of FIG. 1) or a controller device (e.g., controller device 190 of FIG. 1). The sensor data correlates to a first recipe operation of block 310. In some embodiments, recipe operation of block 310 is a change in RF input to the processing chamber. In performing the recipe operation of block 310, a software bridge 370 (e.g., executing on a front end server) applies a stored actuation value at block 371. In some embodiments, the software bridge is a component of a disturbance compensation component of a client device (e.g., client device 192 of FIG. 1) or a controller device (e.g., controller device 190 of FIG. 1). In some embodiments, the stored actuation value is actuation value 176 of FIG. 1, stored in the data store 140 of FIG. 1.

At block 323, the model-based controller 320 receives the sensor data 321 associated with performance of the recipe operation of block 310 and actuation of one or more components based on the actuation value (e.g., concurrent performance of recipe operation and actuation of the component based on the actuation value).

At block 325, the model-based controller determines whether the sensor data (e.g., associated with performance of the recipe operation and actuation of the component based on the actuation value) meets the setpoint data of the recipe operation. If so, flow continues to block 327 and there is no update to the actuation value. If not, flow continues to block 329 and the model-based controller 320 performs an update to the actuation value. In some embodiments, to update the actuation value, method 200A of FIG. 2A is performed.

In some embodiments, the sensor data and/or disturbance data (e.g., difference between sensor data and setpoint data) is compared to a threshold value to determine whether no update is needed (e.g., block 327 or block 329). In some embodiments, the threshold value is a predetermined allowable tolerance of the setpoint data or disturbance data. In some embodiments, a sum squared error is performed (e.g., on the disturbance data) and the sum squared error is compared to a threshold value. In some embodiments, an error is calculated (e.g., disturbance data, difference between sensor data and setpoint data) at different points in time (e.g., sample measure points). The errors may be squared and summed and then compared to a threshold error value.

The updated actuation value is sent to the software bridge to be used in block 371 for subsequent iterations of the recipe operation.

Figure 4:
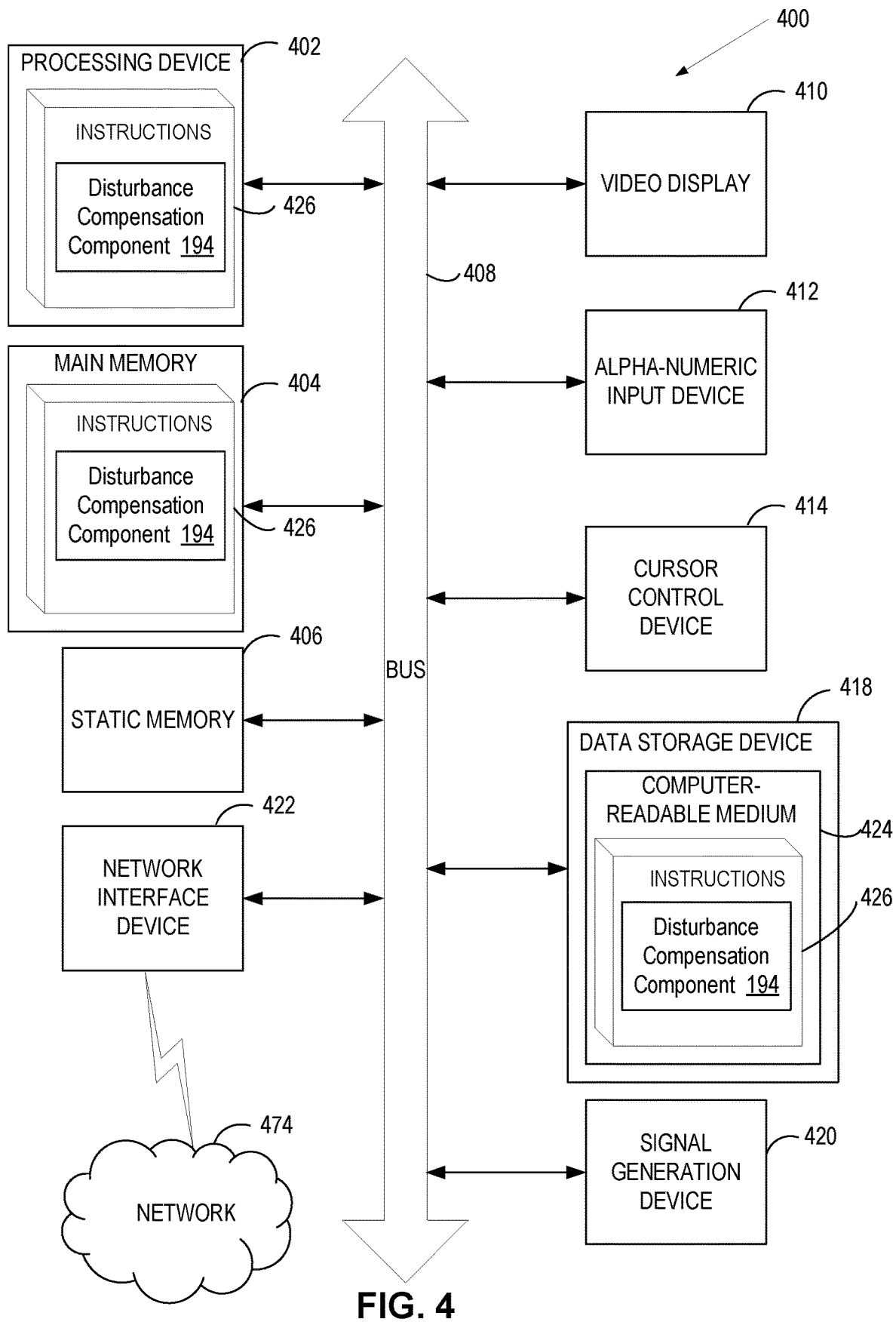
FIG. 4 is a block diagram illustrating a computer system, according to certain embodiments.

FIG. 4 is a block diagram illustrating a computer system 400, according to certain embodiments. In some embodiments, the computer system 400 is the client device 192. In some embodiments, the computer system 400 is the controller device 190 (e.g., server).

In some embodiments, computer system 400 is connected (e.g., via a network, such as a Local Area Network (LAN), an intranet, an extranet, or the Internet) to other computer systems. Computer system 400 operates in the capacity of a server or a client computer in a client-server environment, or as a peer computer in a peer-to-peer or distributed network environment. In some embodiments, computer system 400 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In some embodiments, the computer system 400 includes a processing device 402, a volatile memory 404 (e.g., Random Access Memory (RAM)), a non-volatile memory 406 (e.g., Read-Only Memory (ROM) or Electrically-Erasable Programmable ROM (EEPROM)), and/or a data storage device 416, which communicates with each other via a bus 408.

In some embodiments, processing device 402 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor). In some embodiments, processing device 402 is provided by one or more of a single processor, multiple processors, a single processor having multiple processing cores, and/or the like.

In some embodiments, computer system 400 further includes a network interface device 422 (e.g., coupled to network 474). In some embodiments, the computer system 400 includes one or more input/output (I/O) devices. In some embodiments, computer system 400 also includes a video display unit 410 (e.g., a liquid crystal display (LCD)), an alphanumeric input device 412 (e.g., a keyboard), a cursor control device 414 (e.g., a mouse), and/or a signal generation device 420.

In some implementations, data storage device 418 (e.g., disk drive storage, fixed and/or removable storage devices, fixed disk drive, removable memory card, optical storage, network attached storage (NAS), and/or storage area-network (SAN)) includes a non-transitory computer-readable storage medium 424 on which stores instructions 426 encoding any one or more of the methods or functions described herein, including instructions encoding components of FIG. 1 (e.g., disturbance compensation component 194, etc.) and for implementing methods described herein.

In some embodiments, instructions 426 also reside, completely or partially, within volatile memory 404 and/or within processing device 402 during execution thereof by computer system 400, hence, volatile memory 404 and processing device 402 also constitute machine-readable storage media, in some embodiments.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICs, FPGAs, DSPs or similar devices. In some embodiments, the methods, components, and features are implemented by firmware modules or functional circuitry within hardware devices. Further, the methods, components, and features are implemented in any combination of hardware devices and computer program components, or in computer programs.

Unless specifically stated otherwise, terms such as "identifying," "determining," "causing," "receiving," "generating,", "performing," "updating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein, or it includes a general purpose computer system selectively programmed by a computer program stored in the computer system. Such a computer program is stored in a computer-readable tangible storage medium.

The methods and illustrative examples described herein are not inherently related to any particular computer or other apparatus. Various general purpose systems are used in accordance with the teachings described herein, or, in some embodiments, it proves convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    receiving first sensor data while processing a first substrate during a first execution of a first recipe operation of a substrate processing recipe comprising multiple recipe operations;
    determining disturbance data based on a comparison of the first sensor data and first setpoint data of the first recipe operation, wherein the first setpoint data is indicative of one or more predetermined process condition setpoints for a duration of the first recipe operation;
    determining, based at least in part on the disturbance data, a first actuation value associated with one or more components of a processing chamber, wherein actuation of the one or more components according to the first actuation value compensates for disturbance;
    associating the first actuation value with an identifier corresponding to the first recipe operation, wherein the first actuation value is to be retrieved, via the identifier, for subsequent execution of the first recipe operation; and
    causing, based on retrieval of the first actuation value via the identifier, the actuation of the one or more components while processing the first substrate or a subsequent substrate during a subsequent execution of the first recipe operation of the substrate processing recipe to preemptively compensate for the disturbance.

2. The method of claim 1, wherein the first execution of the first recipe operation is associated with processing a substrate in the processing chamber, and wherein the subsequent execution of the first recipe operation is associated with further processing of the substrate in the processing chamber.

3. The method of claim 1, wherein the first sensor data comprises pressure data and the first setpoint data comprises first pressure setpoint data, and wherein the actuation of the one or more components comprises actuating, based on the first actuation value, a throttle valve of the processing chamber to adjust a flow rate out of the processing chamber to cause the processing chamber to meet the first pressure setpoint data.

4. The method of claim 1, wherein the first sensor data comprises temperature data and the first setpoint data comprises first temperature setpoint data, and wherein the actuation of the one or more components comprises actuating, based on the first actuation value, power provided to a heater of the processing chamber to adjust temperature in the processing chamber to cause the processing chamber to meet the first temperature setpoint data.

5. The method of claim 1 further comprising:
    receiving second sensor data associated with the subsequent execution of the first recipe operation;
    determining second disturbance data, the second disturbance data being a difference between the second sensor data and the first setpoint data; and
    responsive to the second disturbance data meeting a threshold value, determining, based on the second disturbance data, a second actuation value to use with further executions of the first recipe operation.

6. The method of claim 1 further comprising performing one or more of:
    moving-average filtering of the first sensor data or the disturbance data; or
    time-shift compensation of the first sensor data or the disturbance data.

7. The method of claim 1, wherein the determining of the first actuation value comprises providing the disturbance data to a physics-based model and receiving output from the physics-based model indicative of the first actuation value.

8. The method of claim 1, wherein the first setpoint data is indicative of a change in the one or more predetermined process condition setpoints during the first recipe operation.

9. A non-transitory machine-readable storage medium storing instructions which, when executed cause a processing device to:
    receive first sensor data while processing a first substrate during a first execution of a first recipe operation of a substrate processing recipe comprising multiple recipe operations;
    determine disturbance data based on a comparison of the first sensor data and first setpoint data of the first recipe operation, wherein the first setpoint data is indicative of one or more predetermined process condition setpoints for a duration of the first recipe operation;
    determine, based at least in part on the disturbance data, a first actuation value associated with one or more components of a processing chamber, wherein actuation of the one or more components according to the first actuation value compensates for disturbance;
    associate the first actuation value with an identifier corresponding to the first recipe operation, wherein the first actuation value is to be retrieved, via the identifier, for subsequent execution of the first recipe operation; and
    cause, based on retrieval of the first actuation value via the identifier, the actuation of the one or more components while processing the first substrate or a subsequent substrate during a subsequent execution of the first recipe operation of the substrate processing recipe to preemptively compensate for the disturbance.

10. The non-transitory machine-readable storage medium of claim 9, wherein the first execution of the first recipe operation is associated with processing a substrate in the processing chamber, and wherein the subsequent execution of the first recipe operation is associated with further processing of the substrate in the processing chamber.

11. The non-transitory machine-readable storage medium of claim 9, wherein the processing device is further to:
    receive second sensor data associated with the subsequent execution of the first recipe operation;
    determine second disturbance data, the second disturbance data being a difference between the second sensor data and the first setpoint data; and
    responsive to the second disturbance data meeting a threshold value, determine, based on the second disturbance data, a second actuation value to use with further executions of the first recipe operation.

12. The non-transitory machine-readable storage medium of claim 9, wherein the processing device is further to perform one or more of:
    moving-average filtering of the first sensor data or the disturbance data;
    time-shift compensation of the first sensor data or the disturbance data; or
    updating of compensator parameters of the first sensor data or the disturbance data.

13. The non-transitory machine-readable storage medium of claim 9, wherein to determine the first actuation value, the processing device is to provide the disturbance data to a physics-based model and receive output from the physics-based model indicative of the first actuation value.

14. The non-transitory machine-readable storage medium of claim 9, wherein the first setpoint data is indicative of a change in the one or more predetermined process condition setpoints during the first recipe operation.

15. A system comprising:
    memory; and
    a processing device coupled to the memory, the processing device to:
        receive first sensor data while processing a first substrate during a first execution of a first recipe operation of a substrate processing recipe comprising multiple recipe operations;
        determine disturbance data-based on a comparison of the first sensor data and first setpoint data of the first recipe operation, wherein the first setpoint data is indicative of one or more predetermined process condition setpoints for a duration of the first recipe operation;
        determine, based at least in part on the disturbance data, a first actuation value associated with one or more components of a processing chamber, wherein actuation of the one or more components according to the first actuation value compensates for disturbance;
        associate the first actuation value with an identifier corresponding to the first recipe operation, wherein the first actuation value is to be retrieved, via the identifier, for subsequent execution of the first recipe operation; and
        cause, based on retrieval of the first actuation value via the identifier, the actuation of the one or more components while processing the first substrate or a subsequent substrate during a subsequent execution of the first recipe operation of the substrate processing recipe to preemptively compensate for the disturbance.

16. The system of claim 15, wherein the first execution of the first recipe operation is associated with processing a substrate in the processing chamber, and wherein the subsequent execution of the first recipe operation is associated with further processing of the substrate in the processing chamber.

17. The system of claim 15, wherein the processing device is further to:
    receive second sensor data associated with the subsequent execution of the first recipe operation;
    determine second disturbance data, the second disturbance data being a difference between the second sensor data and the first setpoint data; and
    responsive to the second disturbance data meeting a threshold value, determine, based on the second disturbance data, a second actuation value to use with further executions of the first recipe operation.

18. The system of claim 15, wherein the processing device is further to perform one or more of:
    moving-average filtering of the first sensor data or the disturbance data;
    time-shift compensation of the first sensor data or the disturbance data; or
    updating of compensator parameters of the first sensor data or a difference between the first sensor data and the first setpoint data.

19. The system of claim 15, wherein to determine the first actuation value, the processing device is to provide the disturbance data to a physics-based model and receive output from the physics-based model indicative of the first actuation value.

20. The system of claim 15, wherein the first setpoint data is indicative of a change in the one or more predetermined process condition setpoints during the first recipe operation.

* * * * *